United States Patent [19]

Rigat-Esselin et al.

[11] Patent Number: 5,160,928

[45] Date of Patent: Nov. 3, 1992

[54] SYSTEM FOR REGULATING THE MEAN CURRENT FLOWING THROUGH THE LOAD OF AN ELECTRIC REMOTE CONTROL DEVICE

[75] Inventors: J. Pierre Rigat-Esselin, Tassin la Demi Lune; Patrick Gerbier, Montluel; Marc Menvielle, Toulouse, all of France

[73] Assignee: Rexroth-Sigma, France

[21] Appl. No.: 539,569

[22] Filed: Jun. 15, 1990

[30] Foreign Application Priority Data

Jun. 16, 1989 [FR] France .................................. 89 08041

[51] Int. Cl.$^5$ .............................................. G05F 1/44
[52] U.S. Cl. ...................................... 341/20; 323/280; 363/124; 137/636.2
[58] Field of Search ........................ 323/275, 280, 285; 363/124; 341/20; 340/709; 250/211 K; 137/636.2

[56] References Cited

U.S. PATENT DOCUMENTS

| | | | |
|---|---|---|---|
| 4,284,885 | 8/1981 | Swensen | 250/211 K |
| 4,445,541 | 5/1984 | Schmeil | 137/636.2 |
| 4,461,320 | 7/1984 | Burbagli | 137/636.2 |

Primary Examiner—Donald J. Yusko
Assistant Examiner—Michael Horabik
Attorney, Agent, or Firm—Larson & Taylor

[57] ABSTRACT

System for regulating the mean current flowing through a load (1), particularly an electric device controlling the phenomenon to be regulated, from initial variable control information ($\alpha$), a DC voltage source ($V_{alim}$) being provided for supplying this load, comprising: a measuring device (4) for permanently measuring the value of the variable information ($\alpha$); a determination device (5, 6) for causing a mean theoretical current value to be applied to the load (1) to correspond to each value of the information ($\alpha$); a further measuring device (7) for measuring the real DC voltage supplied by the supply voltage source; a computing device (8) for computing, from the determined value of the mean theoretical current and the measured value of the DC supply voltage, a theoretical value of the cyclic ratio (pwm) of a pre-determined fixed frequency square wave voltage signal; a generator (2) for generating a fixed frequency square wave voltage signal having the computed cyclic ratio, this signal being applied to the load; another measuring device (10) for measuring the real mean current flowing through the load; a comparator (11) for comparing the values of the real and theoretical mean currents and generating an error signal ($\epsilon$); and a correcting device (9) for correcting the theoretical value of the cyclic ratio as a function of the error signal.

17 Claims, 3 Drawing Sheets

SYSTEM FOR REGULATING THE MEAN CURRENT FLOWING THROUGH THE LOAD OF AN ELECTRIC REMOTE CONTROL DEVICE

The present invention relates to the regulation of the mean current flowing through a load, particularly an electric device controlling a phenomenon to be regulated, such regulation being effected from variable control information ($\alpha$) and the real value of a voltage supplying this load.

The regulation of a phenomenon, (for example a fluid flow in hydraulic or pneumatic apparatus) may be obtained by corresponding regulation of a current passing through an electric device controlling a regulation device (for example control coil of the slide in a hydraulic slide-valve). This current may be the mean current generated by a pulse width controlled fixed frequency square wave voltage signal. In this case, the value of the mean current depends not only on the cyclic ratio of the pulses but also on the amplitude of these pulses, which may correspond directly to the value of a DC supply voltage; the latter may have a variable value (case of a battery for example) which may undesirably affect the value of the mean current, for a given value of the cyclic ratio. The result is that control of the phenomenon to be regulated risks being disturbed in the presence of a modification of the supply voltage.

The purpose of the invention is then essentially to provide efficient regulation of the mean current flowing through a load such as an electric device controlling a phenomenon to be regulated, so as to overcome the disadvantages of a supply voltage likely to vary and so that regulation of the phenomenon is the exclusive translation as faithful and exact as possible of variable control information.

For this, in a first of its aspects, the invention provides a method for regulating the mean current flowing through a load, particularly an electric device controlling a phenomenon to be regulated, such regulation being made from variable control information and from the real value of a voltage supplying this load, which is characterized in that:

with each real value of the variable control information is associated a pre-established theoretical value of the mean current, the real instantaneous value of the supply voltage is measured, for each theoretical value of the mean current and as a function of the real value of the supply voltage, a theoretical cyclic ratio is determined of a fixed frequency square wave voltage signal, a fixed frequency square wave voltage is generated having said theoretical cyclic ratio, this square wave voltage is applied to the load, the real mean current flowing through said load is measured, said real and theoretical mean currents are compared; an error signal is derived therefrom, and the value of the cyclic ratio from which said square wave voltage signal intended for the load is generated is corrected in the direction of the desired magnitude.

The method of the invention makes possible determination of the cyclic ratio taking into account not only the control or reference voltage, but also the real value of the supply voltage so that the value of the mean current corresponds to what must be effectively received by the means controlling the phenomenon, whatever the variations of the supply voltage may be.

Another important aspect of the method of the invention resides in the double step of creating the square wave voltage signal, consisting first of all in previously generating a signal on the basis of theoretical data, then in refining the thus pre-established signal so that it corresponds to the real conditions. Such regulation is efficient and the response time is short.

In particular, the variable control information may be the angle of inclination of a manual actuator or similar.

In particular, the load may be the electric coil of an electromagnet.

The control member may be provided for regulating the flow of a drive fluid in a fluid actuator device.

Advantageously, at least one pre-established relation $I=f(\alpha)$ between the values of the variable control information ($\alpha$) and the corresponding values of the theoretical mean current is stored and with each value measured of the variable control information ($\alpha$) is associated a corresponding pre-established value of the mean theoretical current. It is then easy to store several pre-established relations $I=f_1(\alpha)$, $I=f_2(\alpha)$, ..., and the desired response curve is chosen beforehand by selecting one of the pre-established relations. This arrangement considerably increases the field of application of the method of the invention and, in a particularly simple (for example actuating a simple switch) and rapid way, the user has the choice of a response curve adapted as well as possible to the conditions, without complication of the means used creating an obstacle.

In a second of its aspects, the invention also provides a system for regulating the current flowing through a load, particularly an electric device for controlling a phenomenon to be regulated from an actuator member, one parameter of which forms initial variable control information, a DC voltage source being provided for supplying this load, which is characterized essentially in that it comprises:

measuring means for permanently measuring the value of the initial variable control information, determination means for causing a mean theoretical current value to be applied to the load to correspond to each value of the information, means for measuring the real DC voltage supplied by the supply voltage source, computing means for computing, from the determined value of the mean theoretical current and the measured value of the DC supply voltage, a theoretical value of the cyclic ratio of a pre-established fixed frequency square wave voltage signal, generating means for generating a fixed frequency square wave voltage signal having said computed cyclic ratio, this signal being applied to the load, measuring means for measuring the real mean current flowing through said load, means for comparing the values of the real and theoretical mean currents and generating an error signal, and means for correcting the theoretical value of the cyclic ratio as a function of said error signal.

Advantageously, the means for determining the theoretical mean current comprise storage means containing, for each possible value of the information, a corresponding value of the theoretical mean current and search means for searching, in the storage means, for the pair of values corresponding to a value of the measured information.

Advantageously, the storage means contain several sets of pairs of values (α, Imoy th), $I=f_1(\alpha)$, $I=f_2(\alpha)$, $I=f_3(\alpha)$, ... and selection means are provided for selecting one of these sets of pairs of values.

The actuator member may be a manual inclinable actuator or similar, and the variable control information is the angle of inclination of this actuator.

The load may be an electromagnet coil and in this case the electromagnet may be associated functionally with an apparatus adjusting the drive fluid flow in a fluid actuator device.

In yet another of its aspects, the invention provides an electric remote control device of the manipulator type or similar, comprising an actuating member, particularly manual, adapted to be rocked angularly about an axis or a fixed point and to generate control information whose value depends on the angular amplitude by which it is rocked, and means for processing signals adapted for regulating the mean current flowing through a load particularly an electric device controlling a phenomenon to be regulated from said control information, which device is characterized in that the signal processing means are formed as described above.

In yet another of its aspects, the invention provides an electric remote control device of the manipulator type or similar, for controlling an electric member, such as a coil controlling an element regulating a hydraulic flow, such as a hydraulic slide valve, this device comprising an actuating member, particularly manual, adapted to be rocked angularly about an axis or a fixed point and to generate control information whose value depends on the angular amplitude by which it is rocked, and means for processing signals adapted for regulating the mean current flowing through said electric control member from said control information, is characterized in that the signal processing means are formed as described above.

In yet another of its aspects, the invention provides an electric remote control device of the manipulator or similar type, comprising a body with bores having parallel axes in which sliding pushers are mounted associated in pairs, particularly symmetrical with respect to the axis of the body, these pushers being actuated by an oscillating cam or similar secured to an actuating member, particularly manual, and being pushed back against said cam or similar by respective resilient means, each pusher being associated with converter means for generating an electric signal one parameter of which is representative of the movement and/or position of said pusher, signal processing means being adapted for processing the signal collected at the output of said converter means and for delivering, to an electric member controlling a phenomenon to be regulated, particularly a hydraulic flow to be regulated, a mean energization current corresponding in a pre-established way to the control communicated by the actuating member, which device is characterized in that the supply voltage processing means are formed as described above.

The invention will be better understood from the following detailed description of some of the preferred embodiments given solely by way of non limitative examples: in this description reference is made to the accompanying drawings in which.

Figure 1:
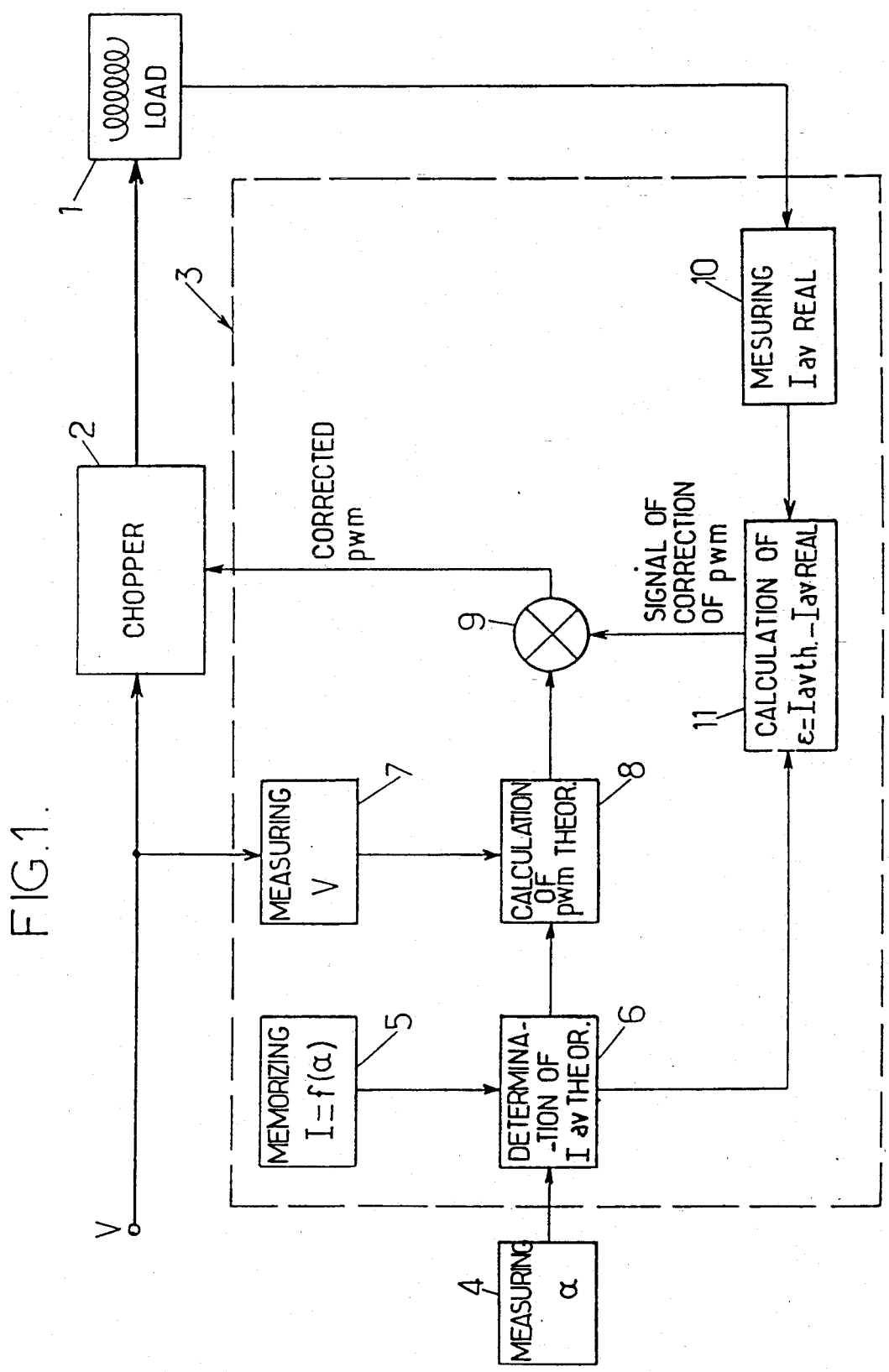
FIG. 1 is a block diagram illustrating a regulation system according to the invention.

Referring first of all to FIG. 1, a load 1 formed by an electric means controlling a phenomenon to be regulated (for example an electromagnet coil actuating a hydraulic slide-valve for regulating the flow of a drive fluid in a hydraulic circuit) is fed with a square wave or chopped voltage delivered by a generator or chopper 2 from a DC supply voltage $V_{alim}$, for example available at the terminals of a battery. The peak value of the voltage square waves corresponds to the value of the supply voltage or is a fixed fraction thereof.

The load 1 is responsive to the instantaneous value of the mean current which flows through it, the value of this mean current depending both on the cyclic ratio pwm and on the amplitude of the voltage square waves.

Now, the supply voltage $V_{alim}$ may have a value variable in time (charging level of a battery, for example) and instantaneously (electric power delivered, for example).

The result is that controlling load 1 by regulating the instantaneous mean current which flows through it involves being able to adjust the cyclic ratio pwm as a function both of control information and of the supply voltage $V_{alim}$ so that the variations thereof remain without influence on the value of the mean current.

The invention provides an automatic control system 3 which answers these aims.

The desired regulation is provided from initial variable control information α whose real value is measured permanently at 4. This information may for example be the angle of inclination of a control lever of the manipulator type; the information α may be the true value of the control magnitude (for example the value of the angle of inclination of the lever of the manipulator), or else it may be the value of a substitution magnitude, particularly electrical, representative of this control magnitude, obtained through converter means (for example an electric signal for which the value of a parameter—amplitude, frequency, etc.—is representative of the value of the control magnitude).

A correspondence $I=f(\alpha)$ is stored at 5 which makes a current value correspond without ambiguity to any value of the control information α. In practice, this correspondence is in the form of a table of pairs of values (I,α) pre-established for all the values of α in a given range, with which current values I are associated respectively in accordance with a pre-established transition function representative of a desired response curve.

From each measured value of the initial information α, at 6 a current value may be associated forming a predetermination of the theoretical mean current intended for load 1.

Furthermore, the real instantaneous value of the supply voltage is measured permanently at 7.

Then, from the value pre-established at 6 of the mean theoretical current and from the real value of the supply voltage measured at 7, a theoretical cyclic ratio pwm is calculated at 8 for a, fixed frequency square wave voltage signal. The value of this theoretical cyclic ratio is applied to a summator 9 which delivers a corrected value of the cyclic ratio which serves as a signal for controlling the generator or chopper 2 delivering the square wave with fixed frequency and controlled variable cyclic ratio intended for load 1.

Moreover, at 10, the mean current actually flowing through load 1 is measured permanently, then at 11 an error signal ε is elaborated by comparing (subtraction) the instantaneous values of the real mean current measured on load 1 and theoretical mean current determined at 6. The error signal ε is then applied via a proportional integration derivation circuit or PID (not shown) to a correction input of summator 9. The error signal ε is homogeneous at a percentage of the value of the cyclic ratio pwm and it is subtracted from or added by the summator 1 to the theoretical value of the cyclic ratio applied at its input so that a corrected value of the cyclic ratio is obtained at the output, which corrected value is used for driving generator 2.

The system which has just been described forms a system for the automatic control of the mean current flowing through the load in which pre-determination of the cyclic ratio pwm permits the operating range of the automatic control to be reduced to the difference existing between the real and theoretical cyclic ratios, whence a considerable gain in response speed.

Furthermore, the practical construction of this automatic control is made particularly easy by using a microprocessor which considerably reduces the number of discrete electronic components and the cost of manufacturing circuits and which greatly reduces the size of the circuit or circuits and makes it possible to house them in a very restricted space.

Figure 2:
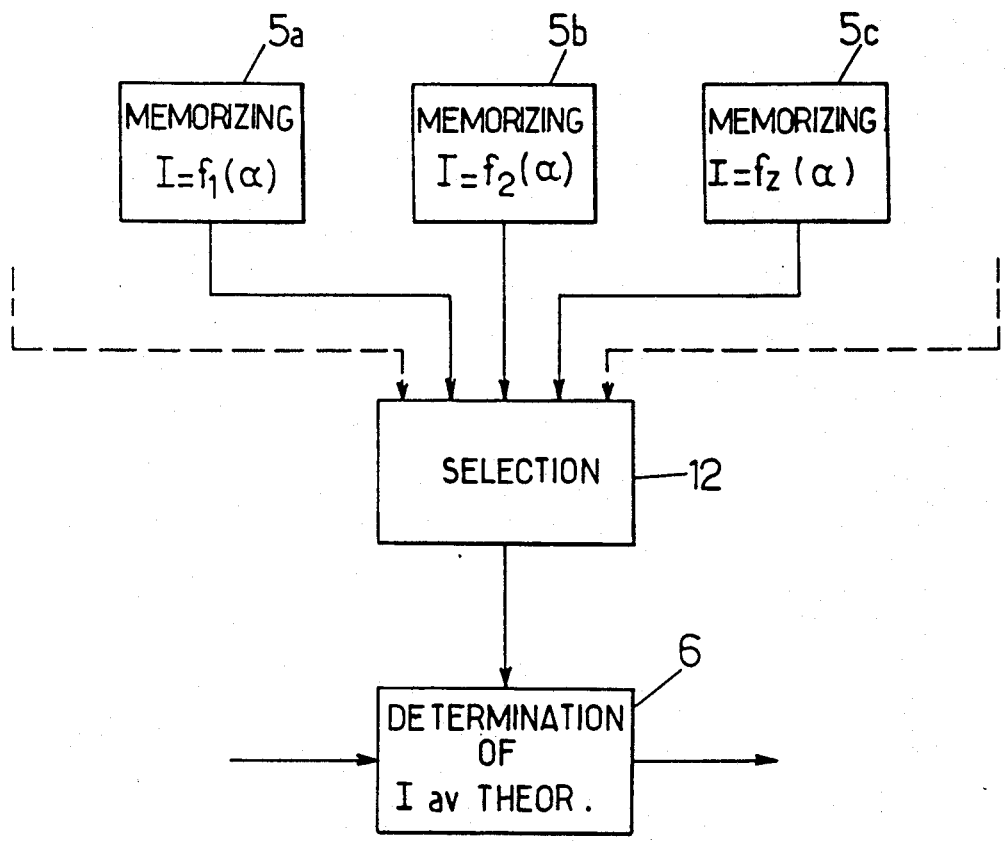
FIG. 2 shows, also in block diagram form, a variant of the regulation system of FIG. 1.

In addition, it is easy to have recourse to auxiliary memories, while keeping the above advantages, for increasing the performances of said system. In particular, it is possible to have several types of response curves, $I=f_1(\alpha)$, $I=f_2(\alpha)$, $I=f_3(\alpha)$, . . . by storing in memories 5a, 5B, 5c (see FIG. 2) respectively the respective tables of correspondence of pairs (I, α); the choice of the desired response curve being made by means of a selector 12 whose output is connected to means 6 determining the mean theoretical current.

Figure 3:
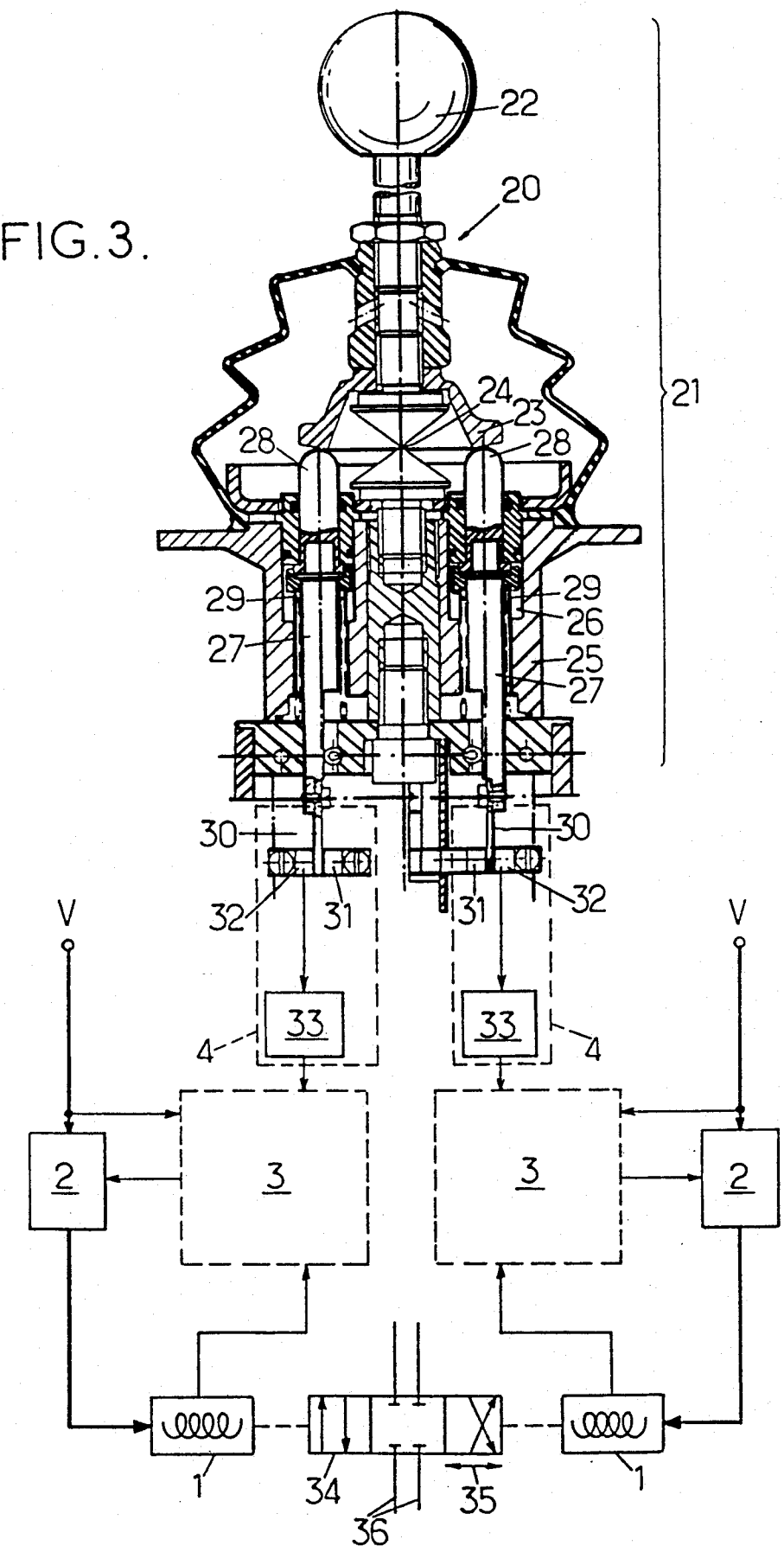
FIG. 3 shows schematically an electric remote control device implementing the regulation system of the invention.

FIG. 3 illustrates fairly schematically one example of application of the automatic control system which has just been described to the control of a hydraulic slide-valve by means of an electric remote control device of the manipulator type. This device is assumed to be of the type with two outputs (namely two control circuits) but the explanations remain valid of course for a device with three or four outputs.

In FIG. 3 an electric remote control device of the manipulator type, designated as a whole by the reference 20, comprises a manual actuation block 21 (upper part of device 20 in FIG. 3) which is adapted conventionally in a way known per se for example for hydraulic manipulators controlling hydraulic slide-valves. In short, actuating handle 22, secured to a cam 23, is mounted for pivoting about an axis 24 (in the case of a control of one or two circuits) or about a rocking point (in the case of a control for more than two circuits, three or four for example). Body 25 which supports handle 22 via its articulation 24 comprises bores 26 with parallel axes in particular symmetrical with respect to the axis of body 25 and in which are disposed sliding rods or pushers 27 ending, at their upper part (in FIG. 3) in fingers 28 projecting from body 25. Compression springs 29 associated with rods 25 urge the latter permanently upwards so that one of the fingers 28 bears against cam 23 when the latter is inclined by actuation leftwards or rightward, for example in FIG. 3) of handle 22.

At the lower part of body 25 project the lower ends of rods 27. At the lower end of each rod 27 is rigidly coupled a plate of an appropriate type with variable transparency, adapted for sliding between an infrared radiation transmitter 31 and receiver 32 disposed facing each other on each side of plate 30 and supported by any appropriate mechanical means adapted for ensuring stability of the system. In FIG. 3, for the sake of clarity, all the electric connections of the transmitter and of the receiver with the electric circuits which are associated therewith have not been shown, all or part of these circuits being able moreover to be housed in an enclosure (not shown) supported by body 25.

Any actuation of handle 22 rightward or leftwards causes a corresponding movement of one of rods 27, so of plate 30 which is associated therewith and the corresponding receiver 32 delivers an electric signal a parameter of which, for example the amplitude, varies in an equivalent way.

The electric remote control device 20 forms then a proportional control which delivers an electric signal representative of a mechanical displacement (angle of inclination of manipulator 22).

It is desirable, in the neutral position or zero position of the device, for it to be the zone of the mobile plate 30 having the greatest opacity which is interposed between transmitter 31 and receiver 32. The electric signal delivered by the receiver has then its minimum value (which may be possibly zero) and the influence of a thermal drift by which it may be affected is reduced thereby.

Furthermore, when the minimum transparency zone present at one end of the mobile plate 30 is completely opaque, it is difficult, even impossible, to ensure good opacity variation progressivity between this totally opaque zone and the beginning of the variable transparency zone. In the case of application to an electric remote control device, for example, this non progressive transition risks causing a jolt in the control of the associated device (a crane arm for example) which may be prejudicial and/or dangerous. In such a case, it is then desirable for the opacity of the minimum transparency zone to be not total.

Turning now to the electronic part of the electric remote control device shown in FIG. 3, the output signal of each receiver 32 is shaped and/or amplified at 33. The assembly formed by, on the one hand, the mobile plate 30, transmitter 31 and receiver 32 (providing a displacement-electric signal conversion) and on the other hand circuit 33 is comparable to circuit 4 of FIG. 1 adapted for delivering an electric signal, one of the parameters of which (amplitude for example) forms the variable control information or is representative of this information.

For the rest, for each control channel, circuit 4 is connected to the input of an automatic control circuit 3 adapted as mentioned above which controls a chopper 2 delivering a chopped voltage to a coil 1 in accordance with a scheme similar to that of FIG. 1. The two coils 1 associated respectively with the two control channels are coupled mechanically to the respective ends of the slide 34 of a hydraulic slide-valve so that energization of one or other of the coils 1 causes the slide 34 to move in one direction or in the other (double arrow 35) thus providing the desired connections in the hydraulic circuit 36.

With this arrangement, a correspondence is established accurately and rapidly between the inclination angle of manipulator 22 and the phenomenon to be regulated (hydraulic flow regulated by the position of the slide of the hydraulic slide-valve in the case of the example of FIG. 3), this correspondence being established by compact controlled electric means and facilitating remote transmission of the control information.

The general data which follows may further be indicated for summing up the advantage presented by the regulation system according to the invention, associated with an electric remote control device of manipulator or similar type, such as the one shown in FIG. 3.

At any time, the electric remote control device may have an output (device with two channels) or two outputs (device with three or four channels) which are active simultaneously and in which the mean current for energizing the corresponding coils is to be regulated.

The corresponding loads (for example coils, which are resistive or self inductive) are connected directly to the supply voltage, the current which flows through them is related directly to the value of this voltage. The voltage applied to each load is obtained by chopping the DC supply voltage and the conduction duration, associated with the real value of the supply voltage, defines the real mean current for energizing the load. Typically, the chopping frequency is 200 Hz (i.e. a period of 5 ms).

The rates of evolution of this current, consecutive to a variation of inclination of the control manipulator, mean that the sampling period must be small with respect to 100 ms (which is the minimum time for tilting the manipulator from the neutral position to one of its maximum inclination positions). A minimum sampling period of 10 ms seems suitable.

However, measurement of the mean current must last a minimum of 5 ms (i.e. extend over at least one period of the signal); in addition, the regulation computation and introduction of the parameters require a time of about 7 ms for each of the outputs. With the data being processed by a single microprocessor which manages the whole of the electronics, the channels are processed one after the other and the total sampling period for processing the two channels is about 24 ms.

In addition, to ensure reliable operation of the mechanical members driven by the hydraulic circuits (elimination of jolts) any current and so hydraulic pressure overshoot must be prohibited.

Finally, the supply voltage delivered for example by a battery of accumulators, may vary in appreciable proportions both in time (for example depending on the electric charge level of the battery) and instantaneously depending on the electric power required (for example a voltage between 8 and 16 volts for a battery rated at 12 V and between 16 and 32 volts for a battery rated at 24 V).

In conclusion, it is necessary to establish a current reference rapidly (for example 100 ms), without overshoot and independently of the real value of the supply voltage: conventional regulation of the proportional integration type or PI does not make it possible to attain these aims simultaneously. On the contrary, every satisfaction is given in practice by the regulation in accordance with the invention which consists, from a preestablished mean current reference and the real value of the supply voltage, in predicting the conduction time of the chopped energization signal, then in correcting this prediction in the case of insufficiency by a conventional PID type regulation whose response speed is suitable for the problem raised.

As is evident and as it follows moreover from what has gone before, the invention is in no wise limited to those of its modes of application and embodiments which have been more especially considered; it embraces, on the contrary, all variants thereof.

We claim:

1. System for regulating the mean current flowing through a load from an actuating member one parameter of which forms initial variable control information, a DC supply voltage source being provided for supplying this load, said system comprising:

measuring means for continuously measuring the value of the initial variable control information, determination means for determining a mean theoretical current value corresponding to each value of the variable control information measured by said measuring means, means for measuring the actual DC voltage supplied by the DC supply voltage source, computing means for computing, from the mean theoretical current value determined by said determining means and the measured value of the DC supply voltage, a theoretical value of the cyclic ratio of a predetermined fixed frequency square wave voltage signal, generating means for generating a fixed frequency square wave voltage signal having said computed cyclic ratio, this signal being applied to the load, further measuring means for measuring the actual mean current flowing through said load, means for comparing the values of the real and theoretical mean currents and generating an error signal, and means for correcting the theoretical value of the cyclic ratio as a function of said error signal.

2. Regulation system according to claim 1, wherein the means for determining the theoretical mean current comprises storage means for storing, for each possible value of the variable control information, a corresponding value of the theoretical means current, and search means for searching, in the storage means, for the pair of values corresponding to a value of the variable control information measured by said measuring means.

3. Regulation system according to claim 2, wherein the storage means contains a plurality of sets of pairs of values and wherein said system further comprises selection means for selecting one of said sets of pairs of values.

4. Regulation system according to claim 1, wherein the actuating member is a manual inclinable actuator, and wherein the initial variable control information is the angle of inclination of said actuator.

5. Regulation system according to claim 1, wherein the load comprises an electromagnet coil.

6. Regulation system according to claim 5, wherein the electromagnet coil is associated functionally with an apparatus for regulating the drive fluid flow in a fluid actuator device.

7. A system according to claim 1, wherein the load comprises an electric device for controlling a phenomenon to be regulated.

8. An electrical system comprising an electric remote control device comprising an actuating member adapted to be rocked angularly about an axis or a fixed point and to generate control information the value of which depends on the angular amplitude through which the actuating member is rocked, and signal processing means for regulating, based on said control information, the mean current flowing through a load device which controls a phenomenon to be regulated, said signal processing means comprising a regulation system comprising: measuring means for continuously measuring the value of the initial variable control information; determination means for determining a mean theoretical current value corresponding to each value of the variable control information measured by said measuring means; means for measuring the actual DC voltage supplied by the DC supply voltage source; computing means for computing, from the mean theoretical current value determined by said determining means and the measured value of the DC supply voltage, a theoretical value of the cyclic ratio of a predetermined fixed frequency square wave voltage signal; generating means for generating a fixed frequency square wave voltage signal having said computed cyclic ratio, this signal being applied to the load; further measuring means for measuring the actual mean current flowing through said load; means for comparing the values of the real and theoretical mean currents and generating an error signal, and means for correcting the theoretical value of the cyclic ratio as a function of said error signal.

9. A system according to claim 8, wherein said control device comprises a manipulator device and said actuating member is adapted to be rocked manually.

10. An electrical system comprising an electric remote control manipulator device for controlling an electric load device, said manipulator device comprising an actuating member adapted to be rocked angularly about an axis or a fixed point and to generate control information the value of which depends on the angular amplitude through which the actuating member is rocked, and signal processing means for processing signals adapted for regulating the mean current flowing through said electric load device based on said control information, said signal processing means comprising a regulation system comprising: measuring means for continuously measuring the value of the initial variable control information; determination means for determining a mean theoretical current value corresponding to each value of the variable control information measured by said measuring means; means for measuring the actual DC voltage supplied by the DC supply voltage source; computing means for computing, from the mean theoretical current value determined by said determining means and the measured value of the DC supply voltage, a theoretical value of the cyclic ratio of a predetermined fixed frequency square wave voltage signal; generating means for generating a fixed frequency square wave voltage signal having said computed cyclic ratio, this signal being applied to the load; further measuring means for measuring the actual mean current flowing through said load; means for comparing the values of the real and theoretical mean currents and generating an error signal; and means for correcting the theoretical value of the cyclic ratio as a function of said error signal.

11. A system according to claim 10, wherein said electric load device comprises a coil for controlling a hydraulic flow regulating element.

12. A system according to claim 10, wherein said electric load device comprises a coil for controlling a hydraulic flow regulating side valve.

13. An electrical system comprising an electric remote control manipulator device, comprising a body with bores having parallel axes in which sliding pushers are mounted associated in pairs, said pushers being actuated by an oscillating cam secured to an actuating member and being pushed back against said cam by respective resilient means, each of said pushers being associated with a respective converter means for generating an electric signal one parameter of which is representative of the movement and/or position of said associated pusher and said system further comprising signal processing means for processing the electric signal generated by said converter means and for delivering, to an electric device controlling a phenomenon to be regulated, a mean energization current corresponding in a pre-established way to the control communicated by the actuating member, said signal processing means comprising an automatic control system comprising: measuring means for continuously measuring the value of the initial variable control information; determination means for determining a mean theoretical current value corresponding to each value of the variable control information measured by said measuring means; means for measuring the actual DC voltage supplied by the DC supply voltage source, computing means for computing, from the mean theoretical current value determined by said determining means and the measured value of the DC supply voltage, a theoretical value of the cyclic ratio of a predetermined fixed frequency square wave voltage signal; generating means for generating a fixed frequency square wave voltage signal having said computed cyclic ratio, this signal being applied to the load; further measuring means for measuring the actual mean current flowing through said load; means for comparing the values of the real and theoretical mean currents and generating an error signal; and means for correcting the theoretical value of the cyclic ratio as a function of said error signal.

14. A system according to claim 13, wherein the converter means comprises a mobile element affixed to the associated pusher and having a transparency varying between a maximum mean value towards one of its ends and a minimum mean value towards its opposite end, an irradiation transmitter and receiver which inwardly face each other and between which the mobile element is disposed so that the mobile element modifies correspondingly the magnitude of the radiation received by the receiver.

15. A system according to claim 14, wherein said pushers are arranged in pairs symmetrical with respect to an axis of the body.

16. A system according to claim 14, wherein said actuating member comprises a manually operated actuator member.

17. A system according to claim 14, wherein said electric device comprises a hydraulic flow regulating device.

* * * * *